United States Patent
Prateek (10) Patent No.: US 12,355,746 B1
(45) Date of Patent: Jul. 8, 2025

(54) EPHEMERAL AUTHORIZATION TOKENS FROM PARTNER TOKENS

(71) Applicant: Amazon Technologies, Inc., Seattle, WA (US)

(72) Inventor: Swagata Prateek, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 775 days.

(21) Appl. No.: 16/785,307

(22) Filed: Feb. 7, 2020

(51) Int. Cl.
*H04L 9/40* (2022.01)
*H04L 9/30* (2006.01)

(52) U.S. Cl.
CPC ............ *H04L 63/0807* (2013.01); *H04L 9/30* (2013.01); *H04L 63/0815* (2013.01); *H04L 63/083* (2013.01)

(58) Field of Classification Search
CPC ... H04L 63/0807; H04L 9/30; H04L 63/0815; H04L 63/083
See application file for complete search history.

(56) References Cited

U.S. PATENT DOCUMENTS

| | | | | |
|---|---|---|---|---|
| 10,616,193 B2* | 4/2020 | Hawkins | ............... | H04L 67/568 |
| 10,860,724 B2* | 12/2020 | Pearson | ............... | G06Q 20/382 |
| 11,212,101 B2* | 12/2021 | Kanukollu | .......... | H04L 63/0876 |
| 11,411,735 B2* | 8/2022 | Mars | ..................... | G06Q 20/308 |
| 2004/0002878 A1* | 1/2004 | Maria Hinton | .... | G06Q 20/3821 |
| | | | | 705/76 |
| 2012/0260322 A1* | 10/2012 | Logan | ..................... | G06F 21/33 |
| | | | | 726/6 |
| 2013/0174244 A1* | 7/2013 | Taveau | ................ | H04L 63/0861 |
| | | | | 726/9 |
| 2014/0040993 A1* | 2/2014 | Lorenzo | ................. | H04L 63/10 |
| | | | | 726/4 |

(Continued)

FOREIGN PATENT DOCUMENTS

WO    WO-2015081899 A1 *  6/2015    ......... G06Q 20/3276

OTHER PUBLICATIONS

Unknown, "OpenID Connect—OpenID", Retrieved from https://openid.net/connect/ on Jan. 16, 2020, pp. 1-4.

(Continued)

*Primary Examiner* — John B King
*Assistant Examiner* — Alex D Carrasquillo
(74) *Attorney, Agent, or Firm* — Robert C. Kowert; Kowert, Hood, Munyon, Rankin & Goetzel, P.C.

(57) ABSTRACT

In a system that controls access to resources via tokens, a system includes an application that generates ephemeral authorization tokens from partner tokens, to increase confidentiality and security, in embodiments. Responsive to a request, received by an application provider, for a protected resource, a federated ID/authorization provider is caused to receive a request for access/ID tokens that the ID/authorization provider provides (in any of various ways) to the application. The application validates and stores the tokens, nests the access/ID tokens within an ephemeral token document having a unique ID and shortened expiration, encrypts the nested ephemeral token using at least resource-specific encryption and causes the encrypted nested token to be sent to the protected resource provider that decrypts and validates the ephemeral token, causes the Access/ID token(s) within the ephemeral token to be validated, and provides the protected resource for valid tokens.

20 Claims, 6 Drawing Sheets

(56) References Cited

U.S. PATENT DOCUMENTS

| | | | |
|---|---|---|---|
| 2014/0189799 A1* | 7/2014 | Lu | H04L 63/102 |
| | | | 726/4 |
| 2015/0206139 A1* | 7/2015 | Lea | G06Q 20/382 |
| | | | 705/44 |
| 2016/0065563 A1* | 3/2016 | Broadbent | H04L 63/0281 |
| | | | 726/9 |
| 2018/0183802 A1* | 6/2018 | Choyi | H04L 63/102 |
| 2018/0255036 A1* | 9/2018 | Fiedler | H04L 43/106 |
| 2018/0351958 A1* | 12/2018 | Sakurai | H04L 63/102 |
| 2018/0375791 A1* | 12/2018 | Kaladgi | H04L 47/821 |
| 2019/0312733 A1* | 10/2019 | Engan | H04L 9/3247 |
| 2019/0319967 A1* | 10/2019 | Holt | G06Q 20/127 |
| 2019/0372958 A1* | 12/2019 | Dunjic | H04L 9/3213 |
| 2020/0329041 A1* | 10/2020 | Mandadi | H04L 63/06 |
| 2021/0226794 A1* | 7/2021 | Axdorff | H04W 12/084 |

OTHER PUBLICATIONS

Unknown, "OpenID Connect", Retrieved from https://auth0.com/docs/protocols/oidc on Jan. 16, 2020, pp. 1-4.

* cited by examiner

1. Single use
2. Expiry c < Expiry a, Expiry b
3. Associated unique ID/Nonce

EPHEMERAL AUTHORIZATION TOKENS FROM PARTNER TOKENS

BACKGROUND

Various identity standards and authentication protocols exist. At least some identity standards and/or authentication protocols provide various levels of integrity (e.g., based on use of signatures in the messages that are passed). However, at least some standards and/or protocols do not provide a level of confidentiality sufficient to meet the security levels required in some systems.

Consider an example system where an authentication server of a partner (e.g., an entity with protected data, such as a financial partner) is a decoupled authentication server. In such a system, the partner authentication server presents the authentication token to an application as part of the protected resource access scheme. When a user tries to access (e.g., via a browser) a protected partner resource an authentication token may be required to be present in either the HTTP URL or the header. In some such systems, the authentication token provides message integrity but not confidentiality because it is exposed in the URL or header. Additionally, some such authentication tokens may be associated with expiration times that are longer than necessary, unnecessarily exposing the system to a security attack. In some instances, a protected data source may not completely trust the decoupled authentication server.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed in more detail below, systems and methods for generation and use of ephemeral authorization tokens from partner tokens is disclosed. In some systems that provide protected resources to requesting entities, tokens are required to be exchanged for the protected resource. The tokens may have various attributes or characteristics that provide integrity, confidentiality, claims, security and the like that act as controls on access to protected resources. In an example, when a user attempts to access a protected resource using a browser, an authentication token may be required to be present in either the HTTP URL or the header. Encrypting tokens and nesting access tokens within nested tokens that are associated with shorter expiration times can increase security and confidentiality, in embodiments.

In an example, a system includes an application that generates ephemeral authorization tokens from partner tokens, to increase confidentiality and security. Responsive to a request, received by an application provider for a protected resource, a federated ID/authorization provider is caused to receive a request for access/ID tokens that the ID/authorization provider provides (in any of various ways) to the application. The application validates and stores the tokens, nests the access/ID tokens within an ephemeral token document having a unique ID and shortened expiration, encrypts the nested ephemeral token using at least resource-specific encryption and causes the encrypted nested token to be sent to the protected resource provider. The protected resource provider decrypts and validates the ephemeral token, causes the federated ID/authorization token(s) within the ephemeral token to be validated, and provides the protected resource for valid tokens.

Figure 1A:
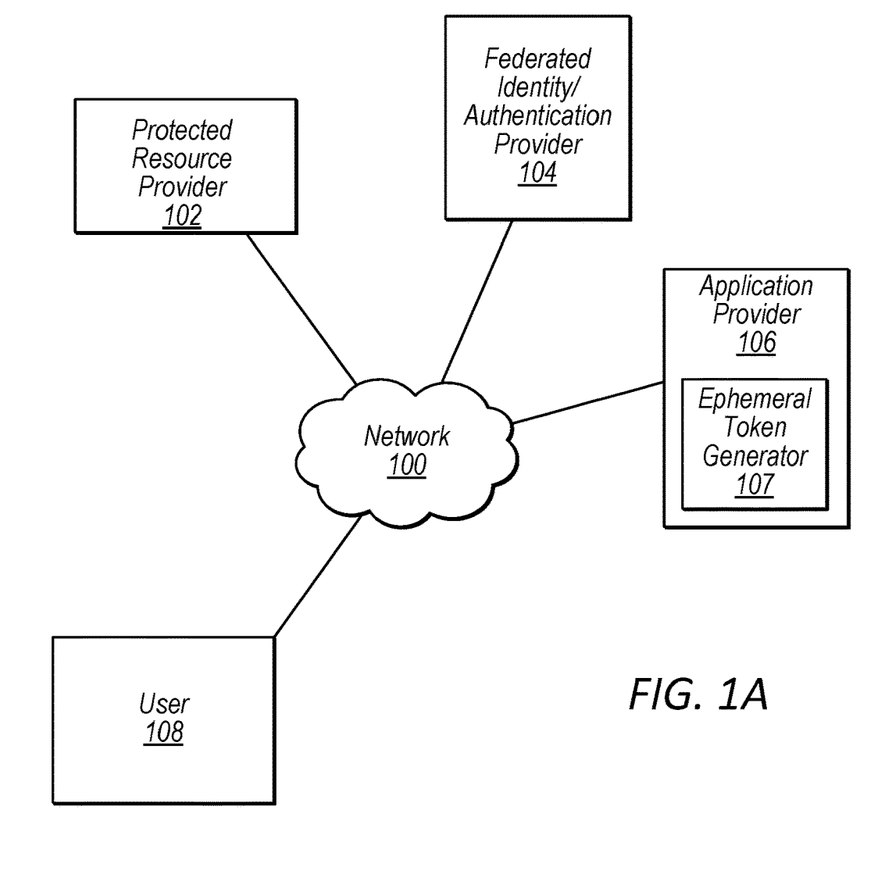
FIG. 1A illustrates a system architecture in which use of, and access to protected resources via, ephemeral authorization tokens generated from partner tokens is implemented, according to some embodiments.

FIG. 1A illustrates a system architecture in which use of, and access to protected resources via, ephemeral authorization tokens generated from partner tokens is implemented, according to some embodiments. Various of the steps illustrated in FIGS. 2-5 may be performed by the illustrated components (e.g., providers 102, 104, 106 or client device of user 108) in embodiments. For example, the processes illustrated in FIGS. 2 and 5 may be performed by an application of application provider 106 (e.g., a "relying" party, in some embodiments) and the process illustrated in FIG. 3 may be performed by the protected resource provider 102 (e.g., a hosted partner website or page). In embodiments, various components of the system illustrated in FIG. 1 may perform various of the steps in FIG. 4. It is contemplated that other components (not illustrated) may perform one or more of the steps, without departing from the scope of the disclosure. The illustrated components may perform more or fewer steps than those illustrated, in some embodiments. In an example, the encrypted nested token document illustrated in FIG. 1B may be generated by application provider 106 and caused to be sent to protected resource provider 102.

Protected Resource Provider 102, Federated Identity/Authentication Provider 104, Application Provider 106 and user 108 (e.g., a client and/or computing device of the user) may communication across one or more networks (e.g., network 100). The system illustrated in FIG. 1A may implement any of various identity standards and authentication protocols (e.g., OpenID, OAuth2, SAML, etc.) in connection with a user's interaction (e.g., via a client executing a web browser or the like) with an application of Application provider 106. For example, protected resource provider may store any of various protected resources (e.g., sensitive or private data) that can be obtained as part of a user's interaction with an application of Application provider 106. Protected resource provider 102 may rely upon a decoupled authentication provider (e.g., Federated Identity/Authentication Provider 104) for authenticating users (e.g., users that want to access the protected resources). The decoupled authentication provider 104 may implement any of various authentication protocols. For example, in an embodiment that implements OAuth 2.0 and OpenID, Application Provider 106 may receive a request for a protected resource and cause a request for Access/ID tokens (tokens necessary to obtain the protected data) to be sent to Federated ID/Authentication Provider 104. Federated ID/Authentication Provider 104 may authenticate the requesting user and generate (e.g., in accordance with OpenID and OAuth2) and respond to the request with the requested Access/ID token document. Each of the Access/ID tokens in the Access/ID token document may be associated with an expiration (e.g., a day, an hour, etc.) The Application Provider 106 may process the received token document into an ephemeral nested token document, associate the ephemeral nested token document with an expiration (e.g., an expiration shorter than the expirations associated with the Access/ID tokens, encrypt the nested document, and cause the document to be sent to the protected resource provider in exchange (e.g., if valid) for the requested protected resource. An example of the nested token document is provided in FIG. 1B, described below.

Figure 1B:
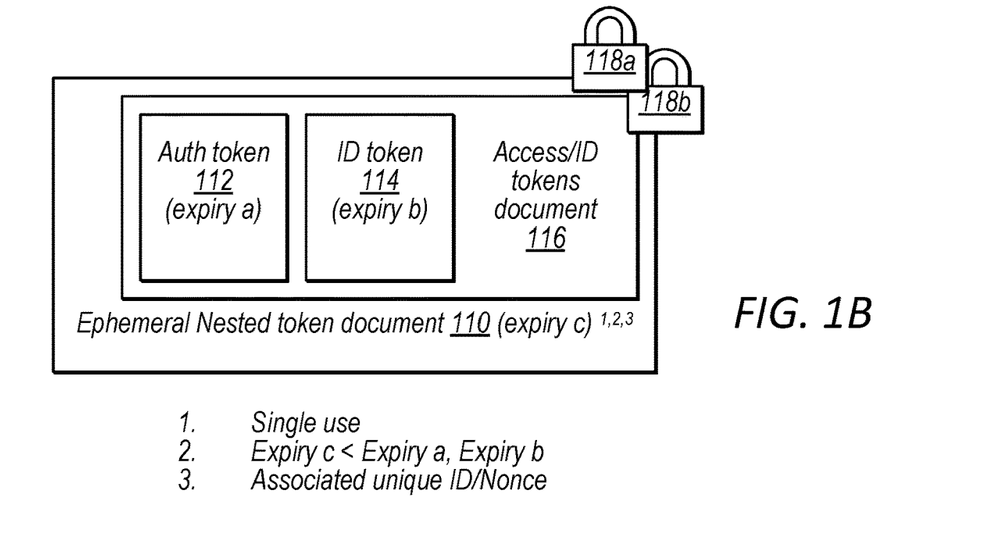
FIG. 1B illustrates arrangement of features of an ephemeral authorization token that is generated from partner tokens, according to embodiments.

FIG. 1B illustrates arrangement of features of an ephemeral authorization token that is generated from partner tokens, according to embodiments. The illustrated encrypted ephemeral authorization token 110 may be generated by Application Provider 106 and caused to be sent to Protected Resource Provider 102 in order to obtain one or more protected resources, in an example. In embodiments of the illustrated nested token, various of the components that are nested may be representative of the actual feature (e.g., an Authorization token 112) while in other embodiments, various of the component that are nested may be based on the feature illustrated (e.g., Ephemeral Nested token document 110 may include actual tokens 112, 114 or may be generated based on tokens 112, 114).

Access/ID tokens document 116 is illustrated as including Authorization token 112 with expiration a, and ID token 114 with expiration b. The Authorization token 112 with expiration a, and ID token 114 with expiration b may have been generated by an authentication service (e.g., Federated Identity Authentication Provider 104), passed to an entity (e.g., passed to Application Provider 106) as a token document (e.g., in accordance with a protocol or standard such as JSON Web tokens (JWT) and used to generate the Ephemeral Nested token document 110. The Ephemeral Nested token document 110 may have or be associated with an expiration c that is different from the expirations of tokens 112 and 114. For example, Authorization and/or ID tokens may be associated with expirations that correspond to use of protected data during a session having a duration. For example, it may be convenient to make access to an application available for a user to make repeated interactions with the application and protected data used by the application. In an instance where a protected resource (e.g., a credit card balance, a social security number, a unique image or the like, etc.) is requested for display, but a session is not necessary (e.g., because there is not continued interaction with the protected resource) the expiration associated with that resource can reduced or shortened, as the access is more ephemeral in nature. As non-exhaustive examples, expiration times for Access/ID tokens may be more on the order of minutes or hours, while expiration times associated with ephemeral nested tokens documents may be more on the order of seconds, milliseconds or the like, for example. Other expiration times, both longer and shorter than those provided as examples are contemplated without departing from the scope of the disclosure.

In some embodiments, Ephemeral Nested token document 110 is associated with or has an expiration c that is shorter than either of expirations a and b of authorization token 112 and ID token 114, respectively. The length of the expiration or the time of the expiration may be determined based on any of a number of different factors, such as network conditions, processing time, or whether a security attack is suspected, etc. Footnote 1 illustrates that Ephemeral Nested token document 110 may be for a single use, in embodiments. Footnote 2 illustrates that expiration c of Ephemeral Nested token document 110 is less than either of expiration a or expiration b, in embodiments. A shorter expiration time may increase the security of the system, in embodiments. Footnote 3 illustrates that a unique number or nonce is associated with Ephemeral Nested token document 110. Such a number may be used by various components of the system to prevent replay attacks, in one example use.

Figure 3:
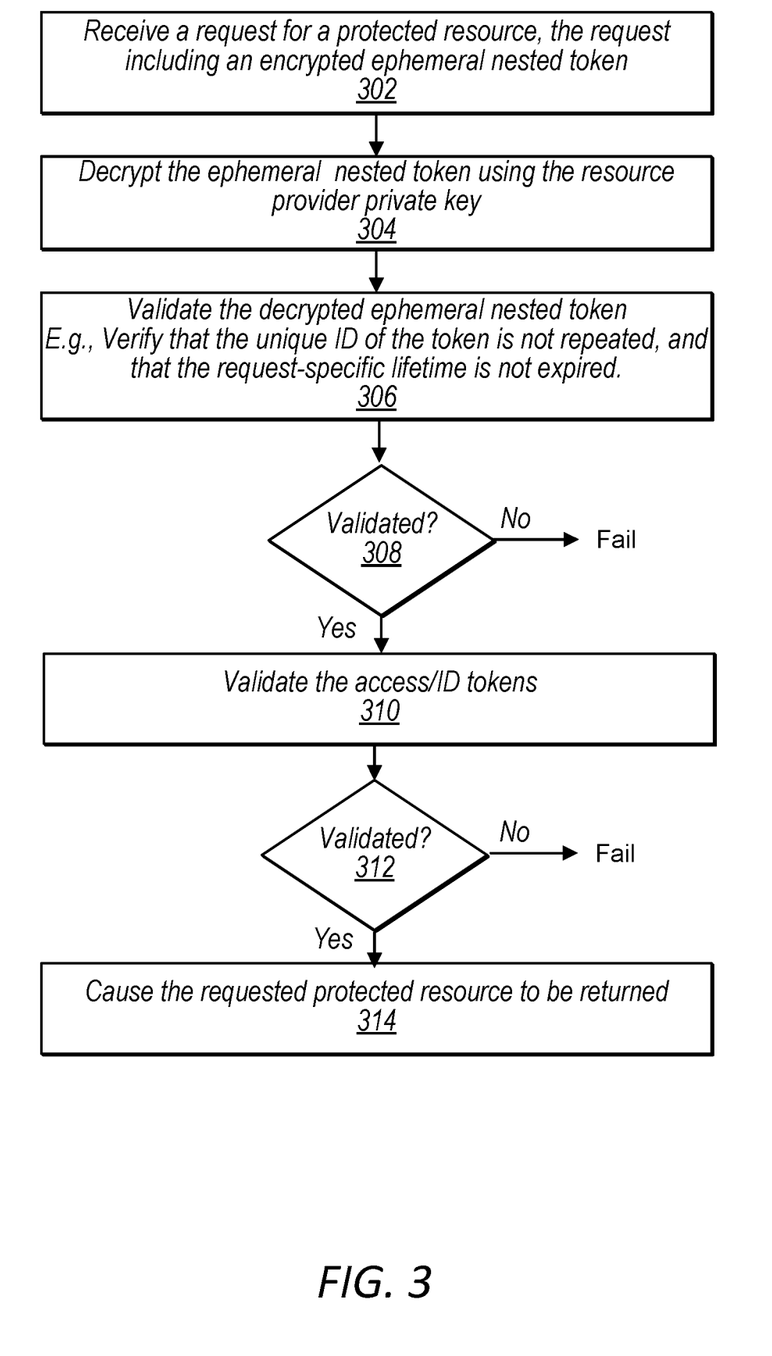
FIG. 3 illustrates a flowchart for processing ephemeral authorization tokens as a technique for controlling access to protected resources, according to some embodiments.
Figure 4:
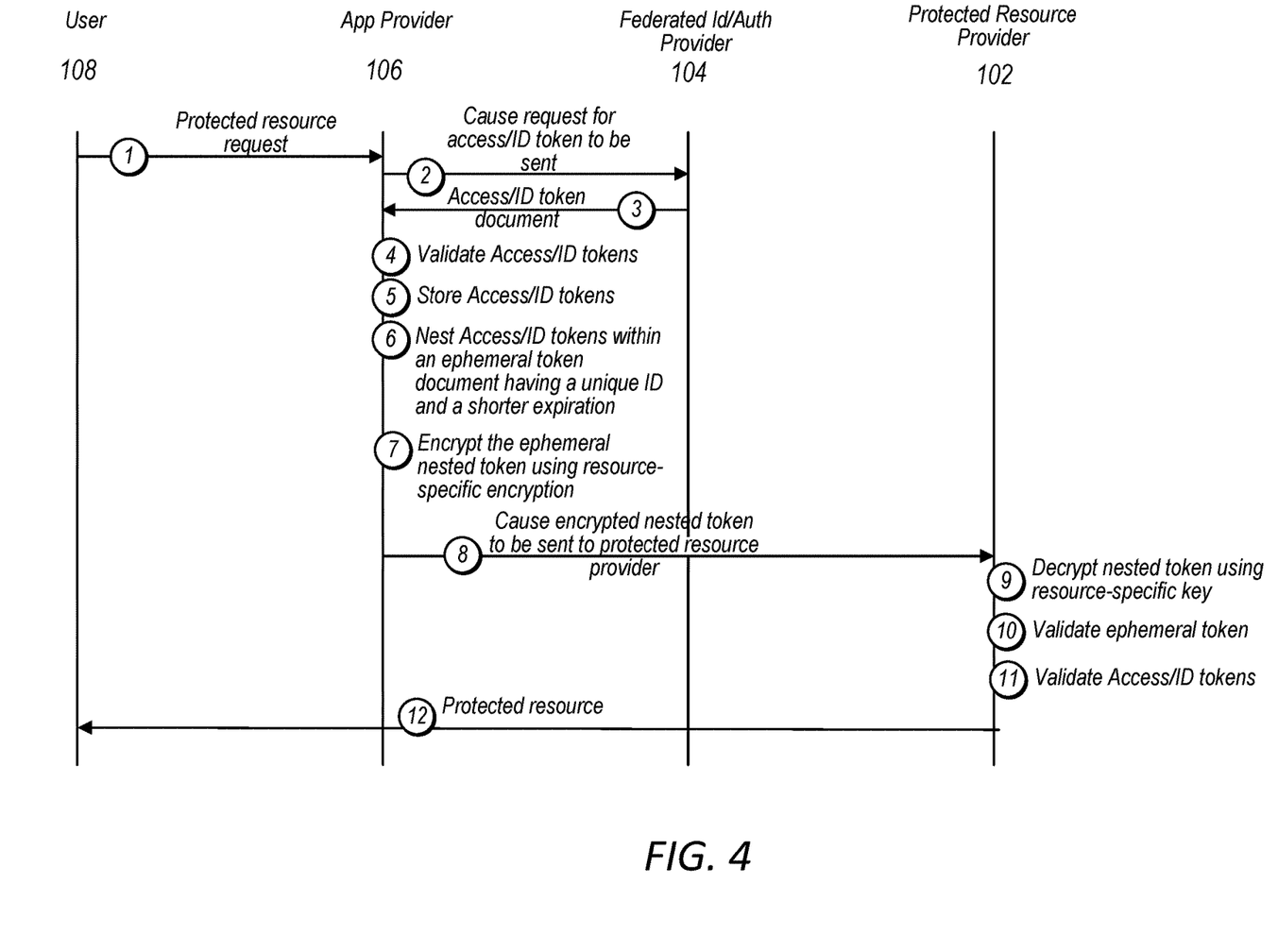
FIG. 4 is a sequence diagram of generation of, and control of access to protected resources by, ephemeral authorization tokens, according to some embodiments.

Ephemeral Nested token document 110 is illustrated with padlocks 118a/118b, each representative of a layer of encryption. As explained below with regard to FIGS. 2-4, the Ephemeral Nested token document 110 may be encrypted prior to being sent to be exchanged for the protected resource. In some embodiments, the Ephemeral Nested token document 110 may be encrypted using encryption (e.g., JSON Web Encryption or the like) associated with Federated Identity/Authentication Provider 104. In some embodiments, the Ephemeral Nested token document 110 may be encrypted using encryption associated with Protected Resource Provider 102. For instance, the Application Provider that generates the Ephemeral Nested token document 110 may have already exchanged keys with Protected Resource Provider 102 and/or with Federated Identify/Authentication Provider 104, prior to generating the Ephemeral Nested token document 110 and may use the respective keys to encrypt the Ephemeral Nested token document 110. In some embodiments, both layers of encryption may be used to encrypt the Ephemeral Nested token document 110 to create a doubly-encrypted Ephemeral Nested token document 110, illustrated in FIG. 1B. The Ephemeral Nested token document 110 may be generated and transmitted in exchange for a protected resource, as illustrated in FIGS. 2-4, described below.

Figure 2:
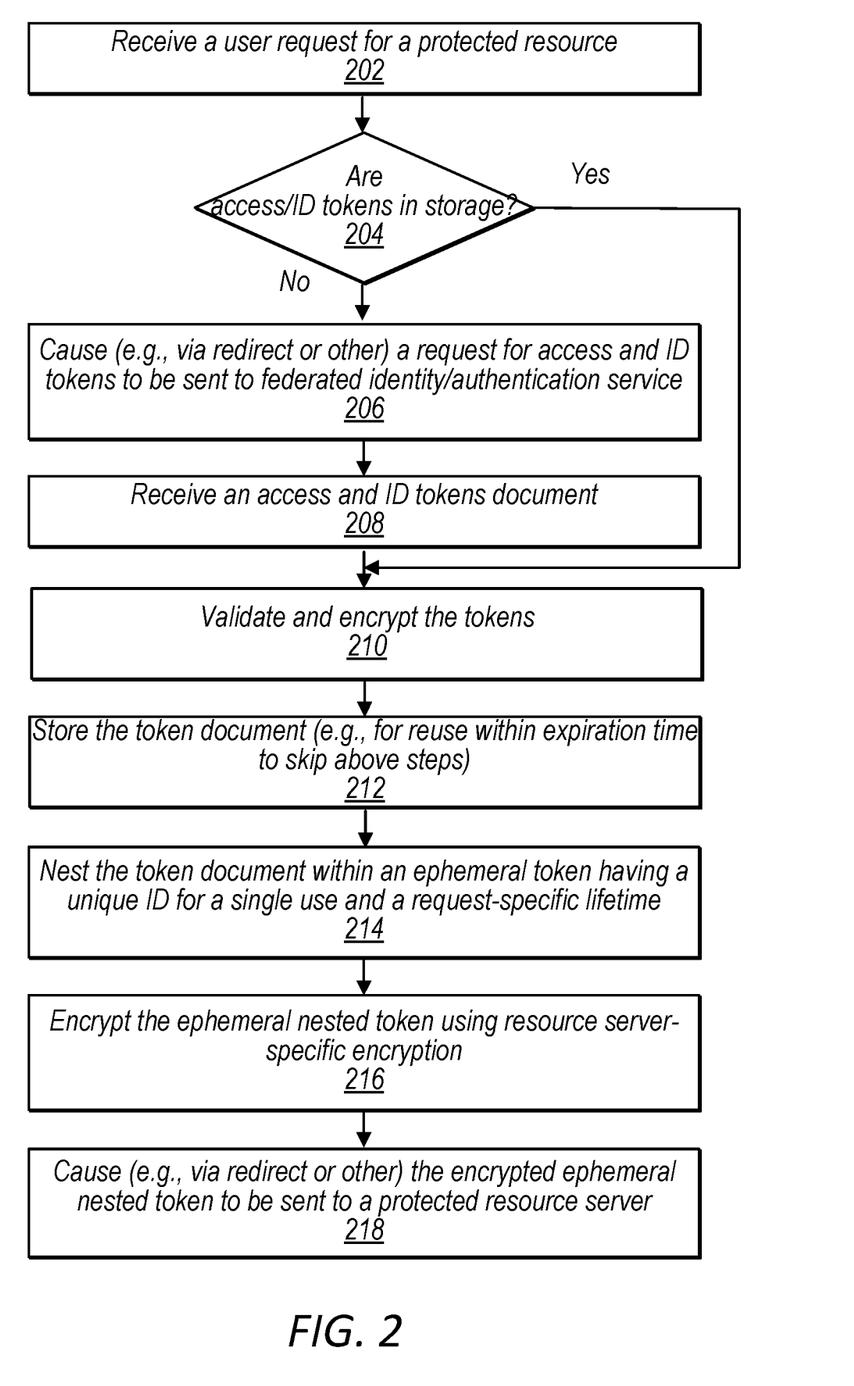
FIG. 2 illustrates a flowchart for generating ephemeral authorization tokens from partner tokens according to some embodiments.

FIG. 2 illustrates a flowchart for generating ephemeral authorization tokens (e.g., Ephemeral Nested token document 110) from partner tokens according to some embodiments. In embodiments, at least some of the illustrated functionality may be performed by one or more of the entities illustrated in FIG. 1, by an ephemeral token generator 107 of the Application Provider 106, for example.

Generally, the illustrated process describes responding to a request for a protected resource by obtaining Access and ID tokens, nesting those tokens into a nested token, encrypting the nested token and causing the encrypted nested token to be exchanged for the protected resource. Such a process may be initiated by any of various requesting entities, such as by a user interacting with a client application such as a web browser executing on a client computing device. Another example is a user using a mobile device to obtain a secure resource over a network. Other use cases are contemplated, almost any scenario where an entity uses a device to obtain protected resources, such as sensitive data, from a protected data source (e.g., financial data providers, content providers, public or private confidential data providers, etc. or the like). The techniques disclosed herein may be used in cases where the protected resource provider has limited trust of an associated authorization server, and/or the data can be obtained with a shorter-lived, ephemeral token.

At block 202, a user request for a protected resource is received. For example, user 108 may interact with a user computing device and cause the user computing device to send (e.g., via a browser or the like) a user request for a protected resource (such as a credit card balance, or the like, etc.) to Application Provider 106 that receives the user request. The Application Provider 106 determines that the request is associated with a protected resource that protected under a federate authentication scheme, in embodiments.

At block 204, the Application Provider 106 determines whether associated access/ID tokens have already been received and stored (e.g., is this a recent returning client making the request?). If so, the process may skip to block 210, described below.

If not (or if the system does not check to see if associated access/ID tokens are stored, in embodiments), at block 206, a request for access and ID tokens is caused to be sent to a federated identity/authentication service (e.g., 104). For example, Application provider 106 may generate the request and embed and send the request in a redirect (e.g., HTTP 302 URL redirection) to a client of a user, such as the browser from which the request for the protected resource was sent. The browser may then redirect the request for the access and ID tokens to Federated Identity/Authentication service (e.g., 104). In another example, the Application Provider 106 may send the request for the access and ID tokens to federated identity/authentication service (e.g., 104) more directly. In some embodiments, the request may be for an authorization token.

At block 208, the access and ID tokens are received (e.g., in a JSON Web Token format/document or otherwise, by Application provider 106 from Federated Id/Authentication Provider 104, via a responding redirect or more directly, in various examples). In some embodiments the access and ID tokens may be encrypted using a Federate ID/Authentication Provider-specific encryption.

In another example, the Federate ID/Authentication Provider 104 may send a code to the Application Provider 106 via the redirect, and the Application Provider 106 may interact directly with the Federate ID/Authentication Provider 104 to exchange the code for the access and ID tokens. If the access and ID tokens were encrypted, they are decrypted using a pre-shared key. In some embodiments, a unique ID associated with the access and ID tokens may be checked against a stored list of prior received unique ids (e.g., to determine if the access/ID tokens are part of a replay attack). If a replay attack, the request for the access/ID tokens will fail, in some embodiments.

Otherwise, the tokens are validated and encrypted (block 210) using the Federate ID/Authentication Provider-specific encryption, in embodiments. For example, a signature, expiration date, claims inside the token, or the like may be verified to validate the tokens, and the token document or tokens themselves may be stored in durable storage. At block 212, tokens may be stored (e.g., in encrypted form or not) for later retrieval and reliance (e.g., within an associated expiration time) to avoid having to resubmit a request for the tokens. Stored tokens may expire in storage and become invalid.

At block 214, the token document (e.g., 116) that includes the access and ID tokens is nested within an ephemeral token (e.g., 110) having a unique ID for a single use and assigned a request-specific lifetime (e.g., FIG. 1B, expiry c). the request-specific lifetime may be shorter than expirations of the access and ID tokens and may be determined in a manner that limits the expiration to roughly the amount of time expected to be necessary to exchange the ephemeral nested token for the protected resource. The nesting may be performed according to any of various standards or APIs, such as the Nest API that uses the OAuth 2.0 protocol for authentication and authorization, or the like.) The nesting may create a nested object or document (e.g., a Nested JSON Web Token, etc.).

At block 216, the ephemeral nested token is encrypted using resource server-specific encryption. For example, the Application Provider 106 may have previously performed a key exchange with Protected Resource Provider 102 such that the ephemeral nested token 110 can be encrypted, by the Application Provider 106, with one of the keys.

In some embodiments, the encryption may be performed using Federated Identity/Authentication Provider-specific encryption. Two levels of encryption may be performed, in embodiments (not illustrated in FIG. 2). For example, the ephemeral nested token 110 can be encrypted using Federated Identity/Authentication Provider-specific encryption (e.g., JSON Web Encryption, or the like, etc.) and then the encrypted bytes from that process can be encrypted using resource server-specific encryption.

At block 218, the encrypted nested token is caused to be sent to the Protected Resource Server. For example, the encrypted nested token may be sent by the Application Provider 106 as a redirect (e.g., HTTP 302 URL redirection) to the client of the user, such as the browser from which the request for the protected resource was sent. The browser may then redirect the encrypted nested token to Protected Resource Provider 102. In another example, the Application Provider 106 may send the encrypted nested token to the Protected Resource Provider more directly. In at least some embodiments, the Application Provider 106 may send the encrypted nested token directly to the user's client device application 108 for use or display directly by the user's client device application. Numerous different types of Federated Identity/Authentication Provider techniques and implementation may be integrated with the techniques described in this disclosure without departing from the scope of the invention.

While FIG. 2 illustrated generation and transmission of an encrypted nested token to be exchanged for a protected resource, FIG. 3 illustrates a flowchart for processing received ephemeral authorization tokens as a technique for controlling access to protected resources, according to some embodiments. The illustrated technique may be performed by Protected Resource Provider 102, in embodiments.

A request for a protected resource is received, the request including an encrypted ephemeral nested token (block 302) and the ephemeral nested token is decrypted using the resource provider private key (block 304). In some embodiments, the particular technique as described herein (e.g., implemented as a protocol) is indicated in a header of the received request. In some embodiments (e.g., where Federated Identity/Authentication Provider-based encryption was used to create the encrypted ephemeral nested token, a private key associated with the Federated Identity/Authentication Provider 104 is used to decrypt the ephemeral nested token (e.g., 110). For example, the Protected Resource Provider 102 may decrypt the encrypted ephemeral nested token using the resource provider's private key and then provide the results in a message to Federated Identity/Authentication Provider 104 to be decrypted using the Federated Identity/Authentication Provider's private key, or the resource provider may obtain the private key from the federated identity provider to perform the decryption. In embodiments wherein the encrypted ephemeral nested token is doubly-encrypted, both private keys may be used to decrypt the ephemeral nested token.

The decrypted ephemeral nested token is validated (block 306). For example, the unique Id associated with the ephemeral nested token may be checked against a list of unique Id's that have already been received to identify and fend off a replay attack, and/or the request-specific lifetime (e.g., expiry c) may be checked for expiration. Signatures may also be checked for validity. If the ephemeral nested token is determined invalid (block 308, no) the request for access to the protected resource fails, the request for the protected resource is declined, and the requesting client or application may be notified of the failure. If the ephemeral nested token is determined valid (block 308, yes) the process continues on to validate the access/ID tokens (block 310). For example, expirations (e.g., expiry a, b) of the tokens may be checked, signatures verified, claims inside the token checked, or the like. In an embodiment where there is only an authorization token, that authorization may be validated.

For a federated ID/authorization token that is found invalid (block 312, no) the request for the protected resource fails, the request for the protected resource is declined, and the requesting entity may be notified. For a federated ID/authorization token that is found valid (block 312, yes) the requested protected resource is caused to be returned (block 314). In some instances, the requested protected resource may be caused to be sent to the Application provider 106 (via URL redirect through the user's browser, for example).

FIG. 4 is a sequence diagram of generation of, and control of access to protected resources by, ephemeral authorization tokens, according to some embodiments. At least some of the functionality depicted in FIGS. 2 and 3 corresponds to functionality depicted in FIG. 4, according to some embodiments.

In some embodiments, various entities 102, 104, 106 may pre-exchange key pairs. For example, Federated Identity/Authentication Provider 104 may pre-exchange keys (e.g., via back-channel or otherwise). FIG. 4 illustrates that a protected resource request (1) is sent from user 108 to Application Provider 106 (e.g., over network 100, in FIG. 1), that the Application Provider responds to the request by causing a request (2) for an Access/ID token to be sent (e.g., via redirect to the user 108, or otherwise), and that the Application Provider 106 receives back the Access/ID token document (3). In FIG. 4, the Application Provider 106 validates (4) the Access/ID tokens, stores (5) the Access/ID tokens (e.g., to a durable data store) and nests (6) the Access/ID tokens within an ephemeral token document that has a unique ID and an assigned expiration shorter than an expiration of the Access/ID tokens. In FIG. 4, the Application Provider 106 encrypts (7) the ephemeral nested token using encryption that is particular to the Protected Resource Provider 102 (In some embodiments, other encryption may be implemented, such as encryption that is particular to the Federated ID/Authentication Provider 104, or both together to create a doubly-encrypted ephemeral nested token) and causes (8) the encrypted nested token to be sent to the Protected Resource Provider 102. The Protected Resource Provider 102 (9) decrypts the ephemeral nested token using the appropriate key (e.g., using a private key that is particular to the Protected Resource Provider or using a private key that is particular to the Federated ID/Authentication Provider 104, or both). In some embodiments, the unique Id/nonce of the ephemeral nested token is stored and compared to a list a prior-received unique Id/nonce to prevent a replay attack. The decrypted ephemeral nested token is validated (10) and the Access/ID tokens are validated (11) (e.g., the ID token may be required for verification by the Protected Resource Provider 102) and, for valid tokens, the protected resource (12) sent to the user (or to the Application Provider 106 via redirect, for example). The Application provider may display the protected resource in a web page of the user's browser or provide the protected data to an application executing on the user's computing device.

Figure 5:
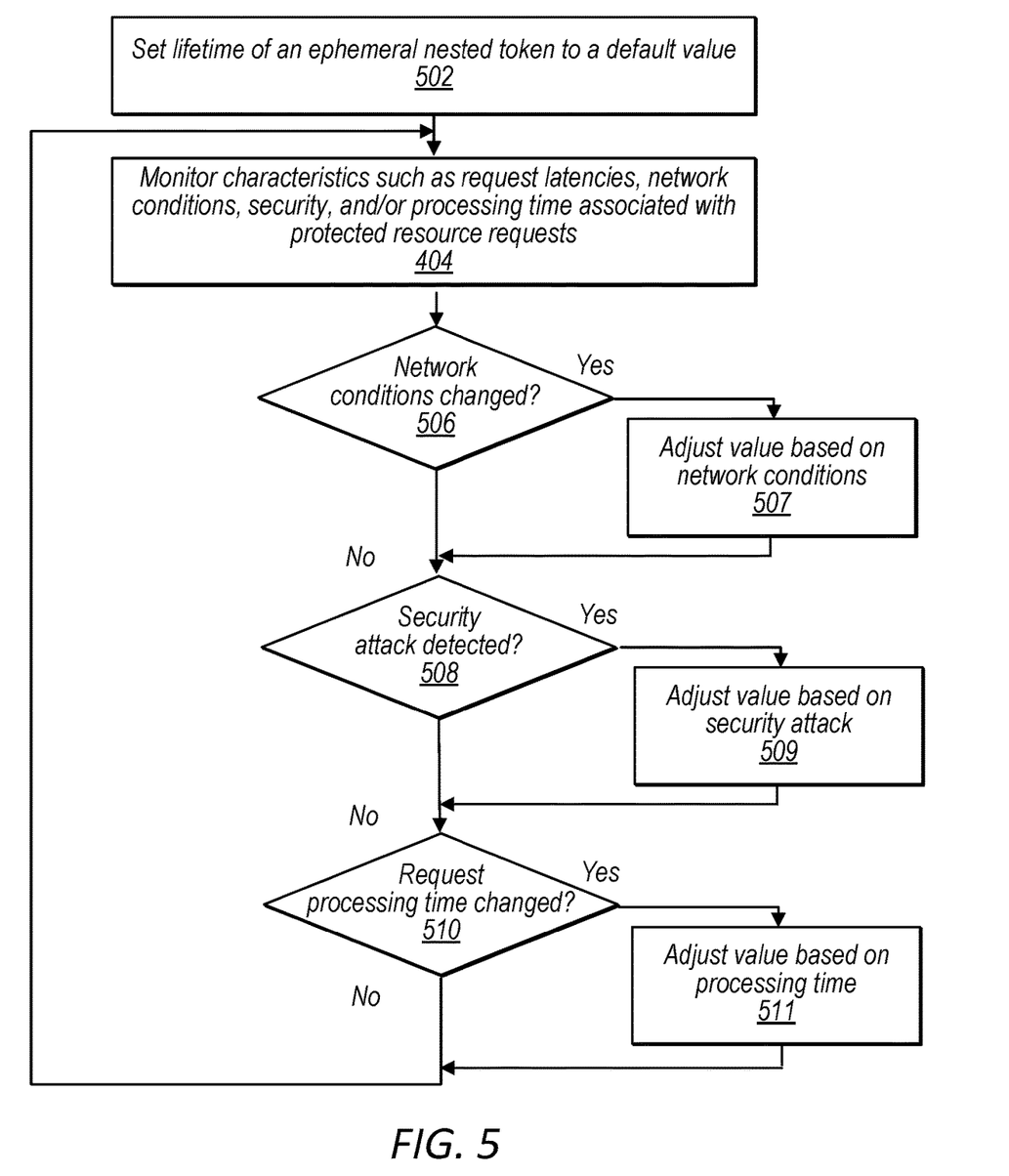
FIG. 5 illustrates a flowchart for adjusting a value for a request-specific ephemeral nested token expiration, according to some embodiments.

FIG. 1B illustrates an ephemeral nested token 110 that has an expiration (expiry c). FIG. 5 illustrates a flowchart for adjusting a value for a request-specific ephemeral nested token expiration (e.g., expiry c), according to some embodiments. The illustrated process may be performed by one or more components of Application Provider 106, in an example. In some instances, it may be desirable to limit an expiration time of a nested token to a shorter period of time than an expiration for the tokens within the nested token. For example, Authorization and/or ID tokens may be associated with expirations that correspond to use of protected data during a session having a duration. For example, it may be convenient to make access to an application available for a user to make repeated interactions with the application and protected data used by the application. In an instance where a protected resource (e.g., a credit card balance, a social security number, a unique image or the like, etc.) is requested for display, but a session is not necessary (e.g., because there is not continued interaction with the protected resource) the expiration associated with that resource can reduced or shortened, as the access is more ephemeral in nature. As non-exhaustive examples, expiration times for Access/ID tokens may be more on the order of minutes or hours, while expiration times associated with ephemeral nested tokens documents may be more on the order of seconds, milliseconds or the like, for example. Other expiration times, both longer and shorter than those provided as examples are contemplated without departing from the scope of the disclosure.

In the illustrated embodiment, a lifetime for an ephemeral nested token is set to a default value. For instance, the default value may be set by an admin for the Application provider. Any number of ephemeral nested tokens may be generated and sent using the default value, in embodiments. As the system runs, characteristics, such as request latencies, network conditions, security attached, and/or processing times associated with protected resource requests maybe monitored. For example, one or more components of Application provider 106 may monitor such characteristics, or a third-party monitoring system may perform the monitoring. FIG. 5 illustrates that if network conditions have changed (block 506, yes) the value for the lifetime for the ephemeral nested token is dynamically adjusted. If not (block 506, no) a determination may be made whether a security attack has been detected and if so (block 508, yes) the value for the lifetime for the ephemeral nested token is dynamically adjusted. For example, if a network attached is identified (e.g., by identifying a replay attack based on the unique ID/nonce of the ephemeral nested token) the lifetime for the ephemeral nested token may be made smaller. If not (block 506, no) a determination may be made whether a request processing time has changed and if so (block 510, yes) the value for the lifetime for the ephemeral nested token is dynamically adjusted. In some instances, the value for the lifetime for the ephemeral nested token may be calculated based on any combination of various ways based on the above criteria. For example, the value for the lifetime for the ephemeral nested token may be determined by identifying some statistically-based round trip time for the ephemeral nested token and adding some threshold amount (adding some padding) as a buffer to the statistically-based round trip time. In another example, the value may be set to a multiple of the statistically-based round trip time for the ephemeral nested token (or set to a multiple of some other statistic).

Example Computer System

Figure 6:
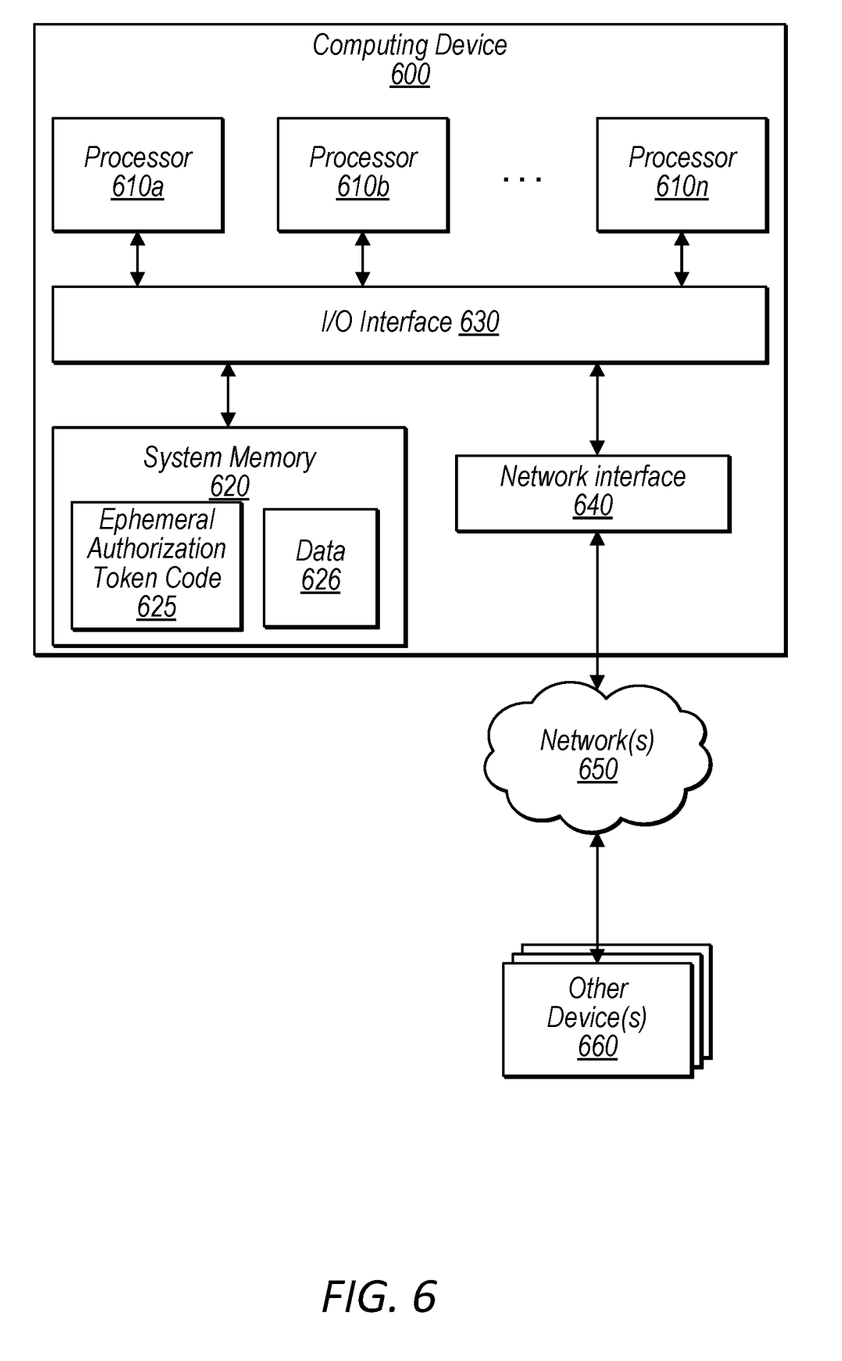
FIG. 6 illustrates a computer system for use in implementing ephemeral authorization tokens generated from partner tokens, according to embodiments.

FIG. 6 illustrates a computer system for use in implementing ephemeral authorization tokens generated from partner tokens, according to embodiments. Various portions of systems in FIG. 1A, 1B and/or methods presented in FIGS. 2-5 described herein, may be executed on one or more computer systems similar to that described herein, which may interact with various other devices of the system.

In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 660, such as cursor control device, keyboard, audio device, and display(s). In some embodiments, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

In some embodiments, at least one processor 610 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for load testing may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 620 may be configured to store program instructions and/or data accessible by processor 610. In various embodiments, system memory 620 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for a distributed load test system and method, are shown stored within system memory 620 as ephemeral authorization token code 625 and data storage 626, respectively. In other embodiments, program instructions and/or data may be received, sent, or stored upon different types of computer-accessible media or on similar media separate from system memory 620 or computer system 600. Generally speaking, a computer-accessible medium may include storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 640. Program instructions may include instructions for implementing the techniques described with respect to any of the FIGs.

In some embodiments, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. In addition, in some embodiments some or all of the functionality of I/O interface 630, such as an interface to system memory 620, may be incorporated directly into processor 610.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Computing device 600 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Memory 620 may include program instructions (e.g., such as ephemeral authorization token code 625), configured to implement embodiments of a distributed load test system and methods as described herein, and data storage 626, comprising various data accessible by the program instructions 625. In one embodiment, program instructions 625 may include software elements of a method illustrated in the above figures. Data storage 626 may include data that may be used in embodiments described herein. In other embodiments, other or different software elements and/or data may be included.

Those skilled in the art will appreciate that computer system 600 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations. In some embodiments, portions of the techniques described herein (e.g., use of, and access to protected resources via, ephemeral authorization tokens generated from partner tokens) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more processors and corresponding memory configured to implement an application provider configured to:
receive, over a network, a request for a protected resource stored at a protected resource server of a protected resource provider;
cause a request for access and ID tokens to be sent to a federated identity/authentication service;
receive an access and ID token document having an associated expiration time,
nest the access and ID token document within a nested ephemeral token having:
a unique ID for single use of the nested ephemeraltoken, and a request-specific lifetime for the nested ephemeral token that is shorter than the associated expiration time of the access and ID token document;
encrypt the nested ephemeraltoken using resource server-specific encryption specific to the protected resource server, wherein the resource server-specific encryption is based at least in part on a key exchange with the protected resource provider; and
cause the encrypted nested ephemeral token to be sent to the protected resource server to provide the requested protected resource if the encrypted nested ephemeraltoken is found valid by the protected resource server.

2. The system of claim 1, wherein the application provider is further configured to:
prior to said encrypt the nested ephemeral token using resource server-specific encryption, encrypt the nested ephemeral token using resource federated identity/authentication service encryption such that subsequent to said encrypt the nested ephemeral token using resource server-specific encryption, the encrypted nested ephemeral token is doubly-encrypted.

3. The system of claim 1, wherein:
the request for the protected resource is from a browser; and
to cause a request for access and ID tokens to be sent to a federated identity/authentication service, the application provider is configured to:
generate a redirect request that comprises the request for access and ID tokens; and
send the redirect request to the browser such that the browser is caused to send the request for access and ID tokens to the federated identity/authentication service.

4. The system of claim 1, wherein:
at least one of the access and ID tokens is associated with an expiration time; and
the application provider is further configured to:
set a lifetime of an expiration of the nested ephemeraltoken to a value less than the associated expiration time for at least one of the access and ID tokens.

5. A computer-implemented method, comprising:
receiving, by an application provider, an authorization token document that authorizes access of a protected resource stored at a protected resource server of a protected resource provider;

generating, by the application provider and based on the authorization token document having an associated expiration time, a nested ephemeral token having:
- a unique ID for single use of the nested ephemeraltoken, and a request-specific lifetime for the nested ephemeral token that is shorter than the associated expiration time of the authorization token document;
- encrypting the nested ephemeraltoken using resource server-specific encryption specific to the protected resource server, wherein the resource server-specific encryption is based at least in part on a key exchange with the protected resource provider; and
- causing the encrypted nested ephemeral token to be sent to the protected resource server to provide the requested protected resource if the encrypted nested ephemeraltoken is found valid by the protected resource server.

6. The method of claim 5, further comprising:
determining a value for a lifetime of an expiration of the nested ephemeral token, wherein the value is based upon one or more of: detection of a security attack, a multiple of a particular metric value determined from monitoring network characteristics, or padding to be added to a particular metric value; and
setting the request-specific lifetime of the expiration of the nested ephemeral token to the value.

7. The method of claim 5, further comprising:
validating the authorization token document prior to said generating the nested ephemeral token.

8. The method of claim 5, further comprising:
storing the authorization token document in durable storage;
receiving an indication that the nested ephemeral token has been determined invalid based upon expiration of the request-specific lifetime;
determining that the stored authorization token has not expired;
generating, based on the token document, another nested ephemeral token having another unique ID for single use and another request-specific lifetime;
encrypting the other nested ephemeral token using resource server-specific encryption; and
causing the encrypted other nested ephemeral token to be sent to the protected resource server.

9. The method of claim 5, wherein said causing the request for the authorization token to be sent to the protected resource server comprises:
generating a redirect request that comprises the request for the authorization token; and
sending the redirect request to a browser such that the browser is caused to send the request for the authorization token to the protected resource server.

10. The method of claim 5, further comprising:
causing a request for the authorization token to be sent to a federated identity/authentication service, wherein causing comprises:
receiving, from the federated identity/authentication service via URL redirection, a code; and
exchanging, with the federated identity/authentication service, the code for the authorization token.

11. The method of claim 5, further comprising:
causing a request for the authorization token to be sent to a federated identity/authentication service, wherein causing comprises:
generating a redirect request that comprises the encrypted nested ephemeral token; and
sending the redirect request to a browser such that the browser is caused to send the encrypted nested ephemeral token to the protected resource server.

12. The method of claim 5, further comprising
encrypting the nested ephemeral nested token using both resource server-specific encryption and federated identity/authentication service-specific encryption to generate a doubly-encrypted nested ephemeral token.

13. A system, comprising:
one or more processors and corresponding memory configured to implement a protected resource provider configured to:
receive a request for a protected resource, the request including an encrypted nested ephemeral token comprising an authorization token having an associated expiration time, the encrypted nested ephemeral token having a request-specific lifetime that is shorter than the associated expiration time of the authorization token;
decrypt the encrypted nested ephemeral token into a nested ephemeral token using a resource provider private key;
for a valid nested ephemeral token with a request-specific lifetime, for the nested ephemeral token, that is not expired, validate the authorization token; and
for a valid authorization token, return the requested protected resource; and
for an invalid nested ephemeraltoken or invalid authorization token, decline the request for the protected resource.

14. The system of claim 13, wherein to decrypt the encrypted nested ephemeral token, the protected resource provider is further configured to:
decrypt, using a private key of a federated identity/authentication service, the results of said decryption of the nested ephemeral token using the resource provider private key.

15. The system of claim 14, wherein the protected resource provider is further configured to:
prior to said decrypt the encrypted nested ephemeral token using the using a private key of the federated identity/authentication service,
generate a pair of keys; and
perform a key exchange of a public key of the keys with the federated identity/authentication service;
wherein the private key is one of the pair of keys.

16. The system of claim 13, wherein the protected resource provider is further configured to:
compare a nonce of the nested ephemeral token to a list of nonce values received with prior requests; and
for the nonce that is a match with a nonce on the list, decline the request for the protected resource.

17. The system of claim 13, wherein the protected resource provider is further configured to:
receive another request for the protected resource, the request including another encrypted nested ephemeral token comprising the same authorization token as in the request for the protected resource;
decrypt the other encrypted nested ephemeral token into another nested ephemeral token using the resource provider private key;
validate the other nested ephemeral token, wherein validate comprises:
determine whether a request-specific lifetime for the other encrypted nested ephemeral token is expired;

for a valid nested ephemeral token with the request-specific lifetime that is not expired,
validate the authorization token; and
for a valid authorization token,
return the requested protected resource.

18. The system of claim 13, wherein to return the requested protected resource, the protected resource provider is further configured to:
generate a redirect request that comprises the protected resource; and
send the redirect request to a browser.

19. The system of claim 13, wherein the protected resource provider is further configured to:
prior to said decrypt the encrypted nested ephemeral token using the resource provider private key, generate a pair of keys; and
perform a key exchange of a public key of the keys with an application provider, wherein the resource provider private key is one of the pair of keys.

20. The system of claim 13, wherein to validate the nested ephemeral token, the protected resource provider is further configured to:
determine whether a unique ID for the encrypted nested ephemeral token is a repeat.

* * * * *